United States Patent
Li

(10) Patent No.: US 11,098,186 B2
(45) Date of Patent: Aug. 24, 2021

(54) PVC RIGID SUBSTRATE, PREPARATION METHOD THEREOF AND PVC RIGID COMPOSITE PLATE

(71) Applicant: Jiangsu Kentier Wood Co., Ltd., Jiangsu (CN)

(72) Inventor: Haixing Li, Jiangsu (CN)

(73) Assignee: Jiangsu Kentier Wood Co., Ltd., Jiangsu (CN)

( * ) Notice: Subject to any disclaimer, the term of this patent is extended or adjusted under 35 U.S.C. 154(b) by 229 days.

(21) Appl. No.: 16/304,784

(22) PCT Filed: Dec. 21, 2016

(86) PCT No.: PCT/CN2016/111275
§ 371 (c)(1),
(2) Date: Nov. 27, 2018

(87) PCT Pub. No.: WO2018/040401
PCT Pub. Date: Mar. 8, 2018

(65) Prior Publication Data
US 2020/0325321 A1 Oct. 15, 2020

(30) Foreign Application Priority Data

Aug. 29, 2016 (CN) .......................... 201610784532.8

(51) Int. Cl.
| C08L 27/06 | (2006.01) |
| B29C 48/02 | (2019.01) |
| B29C 48/00 | (2019.01) |
| B29C 48/13 | (2019.01) |
| C08J 3/20 | (2006.01) |
| B29K 27/06 | (2006.01) |
| B29K 105/00 | (2006.01) |

(52) U.S. Cl.
CPC ............ C08L 27/06 (2013.01); B29C 48/002 (2019.02); B29C 48/022 (2019.02); B29C 48/13 (2019.02); C08J 3/203 (2013.01); *B29K 2027/06* (2013.01); *B29K 2105/0044* (2013.01); *C08L 2201/08* (2013.01); *C08L 2205/025* (2013.01); *C08L 2205/03* (2013.01); *C08L 2205/06* (2013.01)

(58) Field of Classification Search
CPC ............... C08L 27/06; C08L 2205/025; C08L 2205/03; C08L 2205/06; C08L 2201/08; C08J 3/203; B29C 48/002; B29C 48/13; B29C 48/022; B29K 2105/0044; B29K 2027/06
USPC ......................................................... 524/426
See application file for complete search history.

(56) References Cited

U.S. PATENT DOCUMENTS

2003/0211347 A1* 11/2003 Rabinovitch ........... B32B 27/08
428/483
2008/0194736 A1 8/2008 Lu

FOREIGN PATENT DOCUMENTS

| CN | 101104718 A | * | 1/2008 | |
| CN | 101104718 A | | 1/2008 | |
| CN | 101696306 A | * | 4/2010 | |
| CN | 101696306 A | | 4/2010 | |
| CN | 102863711 A | * | 1/2013 | ......... B29C 48/0022 |
| CN | 102863711 A | | 1/2013 | |
| CN | 103865208 A | | 6/2014 | |
| CN | 104231489 A | * | 12/2014 | |
| CN | 104231489 A | | 12/2014 | |
| CN | 104403233 A | | 3/2015 | |
| CN | 104893143 A | * | 9/2015 | |
| CN | 104893143 A | | 9/2015 | |
| CN | 105086232 A | | 11/2015 | |
| JP | S60177054 A | | 9/1985 | |

OTHER PUBLICATIONS

International Search Report of the International Searching Authority, along with its English translation, dated May 26, 2017, issued in connection with International Application No. PCT/CN2016/111275 (8 pages).
Written Opinion of the International Searching Authority, dated May 26, 2017, issued in connection with International Application No. PCT/CN2016/111275 (3 pages).
Office Action, along with an English translation, issued by the State Intellectual Property Office of People's Republic of China dated Aug. 3, 2017, issued in connection with Chinese Application No. 201610784532.8 (13 pages).
Office Action, along with an English translation, issued by the State Intellectual Property Office of People's Republic of China dated Jan. 25, 2018, issued in connection with Chinese Application No. 201610784532.8 (13 pages).

* cited by examiner

Primary Examiner — Michael Bernshteyn
(74) Attorney, Agent, or Firm — McCarter & English, LLP

(57) ABSTRACT

A PVC rigid substrate, a preparation method therefor and a PVC rigid composite plate, wherein the PVC rigid substrate comprises the following raw materials in parts by weight: 40-50 parts of PVC, 75-150 parts of calcium carbonate, 0.6-1.0 parts of balance lubricant, 3.0-5.0 parts of stabilizer and 10-20 parts of CPVC. The PVC substrate has a high hardness, a very small heating size change rate which can be less than or equal to 0.05%. The impact resistance and toughness of a product may be greatly improved to facilitate the treatments that follow. Second, the PVC rigid composite plate has a high mechanical strength and a long service life; at the same time, the PVC rigid substrate can be prepared by using an extrusion method, which is very simple and easy to implement.

3 Claims, No Drawings

PVC RIGID SUBSTRATE, PREPARATION METHOD THEREOF AND PVC RIGID COMPOSITE PLATE

RELATED APPLICATIONS

This application is a U.S. National Phase Application under 35 U.S.C. 371 of International Application No. PCT/CN2016/111275 filed Dec. 21, 2016, and which claims the benefit of priority to Chinese Patent Application No. 201610784532.8 filed on Aug. 29, 2016, the disclosures of which are expressly incorporated herein by reference in their entirety.

TECHNICAL FIELD

The present invention relates to a plate and a preparation method thereof, and specifically relates to a PVC substrate, a preparation method thereof and a PVC composite plate.

BACKGROUND

Plates are widely used in home manufacturing, construction industry, and processing industry due to wide range of sources, great variety, and ease of processing thereof. According to molding structures, plates can be roughly classified into solid wood boards, splints, wood-plastic boards, plywoods, and decorative panels. Of these, the existing PVC plates, mostly added with ortho-benzene plasticizers or p-benzene plasticizers, have soft texture, a high dimensional change rate after heating (up to 0.167%), poor impact resistance and toughness, which is not conducive to the treatments that follow.

Therefore, it is urgent to solve the above technical problems.

SUMMARY

Objectives of the present invention: the first objective of the present invention is to provide a PVC rigid substrate having a better mechanical properties and a longer service life; the second objective of the present invention is to provide a method for preparing the same; the third objective of the present invention is to provide a PVC composite plate prepared therefrom.

Technical solution: a PVC rigid substrate comprises the following raw materials in parts by weight: 40-50 parts of PVC, 75-150 parts of calcium carbonate, 0.6-1.0 parts of balance lubricant, 3.0-5.0 parts of stabilizer and 10-20 parts of CPVC. Wherein, CPVC is a chlorinated polyvinyl chloride resin with a Vicat temperature (heat distortion temperature) of 100-125° C. The high Vicat temperature can optimize performance indexes of the product including hardness, strength, shrinkage change rate and the like. The addition of CPVC increases intermolecular forces, the friction between molecular chains, the equilibrium torque of the solution, and the temperature of the solution. As the intermolecular forces become larger, the hardness and strength of the product become larger; and as the equilibrium torque of the solution increases and the temperature of the solution rises, the Vicat temperature of the product increases and the shrinkage rate of the product becomes smaller.

Another PVC rigid substrate according to the present invention comprises the following raw materials in parts by weight: 40-50 parts of PVC, 75-150 parts of calcium carbonate, 0.6-1.0 parts of balance lubricant, 4.0-6.0 parts of stabilizer, 10-20 parts of CPVC and 5-10 parts of ABS. Wherein, ABS is a terpolymer of acrylonitrile, butadiene and styrene, which contains a double-bond chemical structure. When combined with CPVC, ABS can further improve the impact resistance, heat resistance and low-temperature resistance of the product. It also has the advantages of easy processing, stable product size and the like.

In addition to the above components, the PVC rigid substrate of the present invention may further comprise 0.2-0.6 parts of OPE. Wherein, OPE is oxidized polyethylene wax (also known as OA3). The study found that OPE has good compatibility with PVC and CPVC, can reduce the intermolecular friction, reduce the temperature of the solution, and accelerate the plasticization of the product, and the melting point of OPE is higher than that of PE wax. OPE has excellent temperature resistance, and is less volatile. After long-term high-temperature heating, the die of the PVC extruder can maintain excellent demolding performance. Therefore, OPE combined with CPVC and ABS can further promote plasticization and improve product performances.

Further, the PVC rigid substrate of the present invention may comprise 2-5 parts of MBS. Wherein, MBS is a copolymer of methyl methacrylate, butadiene and styrene. It is found that methyl methacrylate segments and styrene segments in MBS are rigid segments, which are conducive to crushing and melting of CPVC particles in the early stage of CPVC plasticization, thereby improving the processing properties of CPVC; MBS copolymer has a typical core-shell structure, of which the core is styrene butadiene rubber and the shell is polymethyl methacrylate (MMA), and the core and the shell maintain their unique properties, meanwhile the shell has a solubility parameter similar to those of PVC and CPVC. Therefore, the addition of MBS, together with CPVC and ABS, can improve the toughness and impact resistance of the product.

Finally, the PVC rigid substrate of the present invention may further comprise 0.2-0.6 parts of OPE and 2-5 parts of MBS at the same time, with a result that the product performances are furthest improved.

In the present invention, the balance lubricant comprises an internal lubricant and an external lubricant, wherein the weight ratio of the internal lubricant to the external lubricant may be 3:1. The internal lubricant is mainly used to adjust the fluidity of materials, which is beneficial to processing. The internal lubricant may be G60, 3316A and the like, of which the effects are similar; the external lubricant is mainly for facilitating extrusion of materials and improving processing efficiency. It may be PE wax, also known as polyethylene wax; or it may be 1801. The effects of the two external lubricants are similar, each one of the two can be used alone, with similar effect to that when used in combination with the other.

A preparation method of the PVC rigid substrate according to the present invention comprises the following steps: the raw materials are high-speed mixed to 120-125° C., and cold-mixed to 40-45° C. and then discharged into a silo; the material in the silo is sent into an extruder to be extruded and plasticized, and molded by a mold; after passing through three rollers, the molded material is naturally cooled and cut to obtain a PVC rigid substrate.

Wherein, the three rolls comprise a corrugating roller, an embossing roller and a mirror roller connected in sequence.

A PVC rigid composite plate according to the present invention comprises a PVC rigid substrate and semi-rigid PVC layers respectively located on the upper and lower surfaces of the substrate, and the thickness of the plate obtained is 3.0-10.0 mm; or the PVC rigid composite plate comprises a PVC rigid substrate and a color film and a wear layer disposed on the surface of the substrate in sequence, the thickness of the plate obtained is 3.0-10.0 mm; wherein the first composite plate has better performances than the second one, and the material composition of the semi-rigid PVC layer can be found in the applicant's another Chinese patent application No. 201510479359.6 entitled "PVC substrate, preparation method thereof and PVC composite plate".

Wherein, the surface of the obtained PVC rigid plate may be sequentially subjected to UV treatment, hot-water heat treatment and cold-water cooling, and then die-cut and slotted to obtain a finished floor.

Advantageous effects: as compared to the existing technologies, the present invention has the following beneficial effects: first, the PVC substrate of the present invention has a higher hardness, a very small dimensional change rate after heating which can be less than or equal to 0.05%, the impact resistance and toughness of a product may be greatly improved to facilitate the treatments that follow; second, the PVC rigid composite plate has a higher mechanical strength and a longer service life; at the same time, the PVC rigid substrate can be prepared by using an extrusion method, which is simple and easy to implement.

DETAILED DESCRIPTION

The technical solution of the present invention is further described below in conjunction with the following examples.

Example 1: Preparation of a PVC Substrate

Raw materials (parts by weight, the same below): 40 parts of PVC, 75 parts of calcium carbonate, 0.5 parts of internal lubricant (G60), 0.1 parts of external lubricant (PE wax), 3.0 parts of calcium-zinc composite stabilizer (LY21) and 10 parts of CPVC.

Wherein, the PVC was purchased from Hwasu Corporation in Anhui Province, the calcium carbonate was purchased from Xingchen Corporation in Zhenjiang City, the G60 was purchased from Zibo Linzi Dinghao Chemicals Co., Ltd. in Shandong Province, the PE wax was purchased from BASF, the LY21 was purchased from Honeywell, USA, and the CPVC was purchased from Gaoxin Chemicals Co., Ltd. in Shandong Province.

Preparation method: the raw materials according to the above formula were high-speed mixed to 120° C., and cold-mixed to 40° C. and then discharged into a silo; the mixed material in the silo was sent into an extruder to be extruded and plasticized, and molded by a mold; after passing through three rollers, the molded material was naturally cooled and cut to obtain a substrate. A wear layer and a color film were sequentially attached to the surface of the substrate, and hot pressed with a hot press to obtain a rigid PVC substrate; the surface of the rigid PVC substrate may be sequentially subjected to UV treatment and hot-water heat treatment, and then die-cut, slotted to obtain a product.

Example 2: Preparation of a PVC Substrate

Raw materials: 50 parts of PVC, 150 parts of calcium carbonate, 0.7 parts of internal lubricant (3316A), 0.3 parts of external lubricant (1801), 5.0 parts of calcium-zinc composite stabilizer (YQ102), 20 parts of CPVC and 10 parts of ABS.

Wherein, the YQ102 was purchased from Honeywell, USA, and the ABS was purchased from Taiwan Chimei Corporation, and the other raw material sources were the same as those in Example 1.

Preparation method: the raw materials according to the above formula were high-speed mixed to 125° C., and cold-mixed to 45° C. and then discharged into a silo; the mixed material in the silo was sent into an extruder to be extruded and plasticized, and molded by a mold; after passing through three rollers, the molded material was naturally cooled and cut to obtain a substrate. A wear layer and a color film were sequentially attached to the surface of the substrate, and hot pressed with a hot press to obtain a rigid PVC substrate; the surface of the rigid PVC substrate may be sequentially subjected to UV treatment and hot-water heat treatment, and then die-cut, slotted to obtain a product.

Example 3: Preparation of a PVC Substrate

Raw materials: 45 parts of PVC, 90 parts of calcium carbonate, 0.6 parts of internal lubricant (G60), 0.2 parts of external lubricant (PE wax), 4.0 parts of calcium-zinc composite stabilizer (CZ96), 15 parts of CPVC, 5 parts of ABS and 0.2 parts of OPE.

Wherein, the CZ96 was purchased from Honeywell, USA, the OPE was purchased from BASF, and the other raw material sources were the same as those in Example 1.

Preparation method: the raw materials according to the above formula were high-speed mixed to 122° C., and cold-mixed to 42° C. and then discharged into a silo; the mixed material in the silo was sent into an extruder to be extruded and plasticized, and molded by a mold; after passing through three rollers, the molded material was naturally cooled and cut to obtain a substrate. A wear layer and a color film were sequentially attached to the surface of the substrate, and hot pressed with a hot press to obtain a rigid PVC substrate; the surface of the rigid PVC substrate may be sequentially subjected to UV treatment and hot-water heat treatment, and then die-cut, slotted to obtain a product.

TABLE 1

Performance comparison of PVC substrates prepared in Examples 1-3

| Performance indexs | Tensile strength of tongue-and-groove lap, N/cm | Length change rate after heating, % | Thermal warping, mm | Residual indentation, mm |
|---|---|---|---|---|
| Example 1 | 32 | 0.09 | 0.85 | 0.09 |
| Example 2 | 70 | 0.008 | 0.55 | 0.02 |
| Example 3 | 40 | 0.050 | 0.70 | 0.06 |

Example 4

Raw materials: 40 parts of PVC, 75 parts of calcium carbonate, 0.5 parts of internal lubricant (G60), 0.1 parts of external lubricant (PE wax), 3.0 parts of calcium-zinc composite stabilizer (LY21) and several parts of CPVC.

Eight sets of parallel tests were designed, in which the content of CPVC was 5, 10, 12, 14, 16, 18, 20 and 25 parts, respectively.

The preparation method was the same as that in Example 1.

TABLE 2

Performance comparison of substrates prepared with different contents of CPVC resin

| Serial numbers | 1 | 2 | 3 | 4 | 5 | 6 | 7 | 8 |
|---|---|---|---|---|---|---|---|---|
| CPVC, parts by weight | 5 | 10 | 12 | 14 | 16 | 18 | 20 | 25 |

TABLE 2-continued

| Performance comparison of substrates prepared with different contents of CPVC resin | | | | | | | | |
|---|---|---|---|---|---|---|---|---|
| Serial numbers | 1 | 2 | 3 | 4 | 5 | 6 | 7 | 8 |
| Tensile strength of tongue-and-groove lap, N/cm | 27 | 32 | 35 | 39 | 43 | 53 | 65 | 62 |
| Length change rate after heating, % | 0.060 | 0.050 | 0.040 | 0.030 | 0.025 | 0.020 | 0.010 | 0.010 |
| Thermal warping, mm | 1.10 | 0.65 | 0.30 | 0.35 | 0.45 | 0.75 | 0.60 | 0.63 |
| Residual indentation, mm | 0.10 | 0.09 | 0.08 | 0.07 | 0.05 | 0.03 | 0.01 | 0.01 |

It can be seen from Table 2 that with the increase of the content of CPVC resin, the performance curve of the substrate showed a trend of: first rising and then slightly decreasing. This was because the higher the added amount of CPVC, the greater the intermolecular forces and the friction between molecular chains. The greater the equilibrium torque of the solution, the greater the hardness and strength of the product, and the shrinkage rate of the product became smaller.

Example 5

Raw materials: 50 parts of PVC, 150 parts of calcium carbonate, 0.7 parts of internal lubricant (3316A), 0.3 parts of external lubricant (1801), 5.0 parts of calcium-zinc composite stabilizer (YQ102), 20 parts of CPVC and several parts of ABS.

Eight sets of parallel tests were designed, in which the content of ABS was 2, 5, 6, 7, 8, 9, 10 and 14 parts, respectively.

The preparation method was the same as that in Example 1.

TABLE 3

| Performance comparison of substrates prepared with different contents of ABS | | | | | | | | |
|---|---|---|---|---|---|---|---|---|
| Serial numbers | 1 | 2 | 3 | 4 | 5 | 6 | 7 | 8 |
| ABS, parts by weight | 2 | 5 | 6 | 7 | 8 | 9 | 10 | 14 |
| Tensile strength of tongue-and-groove lap, N/cm | 30 | 35 | 45 | 55 | 60 | 68 | 70 | 68 |
| Length change rate after heating, % | 0.058 | 0.045 | 0.035 | 0.030 | 0.020 | 0.010 | 0.008 | 0.010 |
| Thermal warping, mm | 0.90 | 0.50 | 0.45 | 0.35 | 0.40 | 0.45 | 0.55 | 0.60 |
| Residual indentation, mm | 0.09 | 0.08 | 0.07 | 0.07 | 0.06 | 0.04 | 0.02 | 0.01 |

Example 6

Raw materials: 45 parts of PVC, 90 parts of calcium carbonate, 0.6 parts of internal lubricant (G60), 0.2 parts of external lubricant (PE wax), 4.0 parts of calcium-zinc composite stabilizer (CZ96), 15 parts of CPVC, 5 parts of ABS and several parts of OPE.

Eight sets of parallel tests were designed, in which the content of OPE was 0.1, 0.2, 0.3, 0.35, 0.4, 0.5, 0.6 and 0.8 parts, respectively.

The preparation method was the same as that in Example 1.

TABLE 4

| Performance comparison of substrates prepared with different contents of OPE as raw material | | | | | | | | |
|---|---|---|---|---|---|---|---|---|
| Serial numbers | 1 | 2 | 3 | 4 | 5 | 6 | 7 | 8 |
| OPE, parts by weight | 0.1 | 0.2 | 0.3 | 0.35 | 0.4 | 0.5 | 0.6 | 0.8 |
| Tensile strength of tongue-and-groove lap, N/cm | 35 | 40 | 50 | 55 | 65 | 70 | 72 | 70 |

TABLE 4-continued

Performance comparison of substrates prepared with different contents of OPE as raw material

| Serial numbers | 1 | 2 | 3 | 4 | 5 | 6 | 7 | 8 |
|---|---|---|---|---|---|---|---|---|
| Length change rate after heating, % | 0.056 | 0.050 | 0.045 | 0.020 | 0.010 | 0.006 | 0.004 | 0.010 |
| Thermal warping, mm | 0.90 | 0.70 | 0.35 | 0.30 | 0.40 | 0.40 | 0.45 | 0.50 |
| Residual indentation, mm | 0.09 | 0.06 | 0.05 | 0.05 | 0.04 | 0.03 | 0.01 | 0.01 |

Example 7

Raw materials: 45 parts of PVC, 90 parts of calcium carbonate, 0.6 parts of internal lubricant (G60), 0.2 parts of external lubricant (PE wax), 4.0 parts of calcium-zinc composite stabilizer (CZ96), 15 parts of CPVC, 5 parts of ABS, 0.2 parts of OPE and several parts of MBS.

Eight sets of parallel tests were designed, in which the content of MBS was 1, 2, 2.5, 3, 3.5, 4, 5 and 7 parts, respectively.

The preparation method was the same as that in Example 1.

TABLE 5

Performance comparison of substrates prepared with different contents of OPE as raw material

| Serial numbers | 1 | 2 | 3 | 4 | 5 | 6 | 7 | 8 |
|---|---|---|---|---|---|---|---|---|
| MBS, parts by weight | 1 | 2 | 2.5 | 3 | 3.5 | 4 | 5 | 7 |
| Tensile strength of tongue-and-groove lap, N/cm | 35 | 50 | 60 | 65 | 80 | 85 | 90 | 85 |
| Length change rate after heating, % | 0.056 | 0.040 | 0.030 | 0.010 | 0.005 | 0.005 | 0.004 | 0.005 |
| Thermal warping, mm | 0.90 | 0.60 | 0.30 | 0.20 | 0.30 | 0.35 | 0.20 | 0.25 |
| Residual indentation, mm | 0.09 | 0.05 | 0.04 | 0.03 | 0.03 | 0.02 | 0.01 | 0.01 |

What is claimed is:

1. A PVC rigid substrate, wherein the PVC rigid substrate comprises the following raw materials in parts by weight: 45 parts of PVC, 90 parts of calcium carbonate, 0.6 parts of internal lubricant (G60), 0.2 parts of external lubricant (PE wax), 4.0 parts of calcium-zinc composite stabilizer (CZ96), 15 parts of CPVC, 5 parts of ABS, 0.2 parts of OPE and 5 parts of MBS.

2. A preparation method of the PVC rigid substrate according to claim 1, wherein the preparation method comprises the following steps: the raw materials are high-speed mixed to 120° C., and cold-mixed to 40° C. and then discharged into a silo; the material in the silo is sent into an extruder to be extruded and plasticized, and molded by a mold; after passing through three rollers, the molded material is naturally cooled and cut to obtain a PVC rigid substrate.

3. The preparation method of the PVC rigid substrate according to claim 2, wherein the three rolls comprise a corrugating roller, an embossing roller and a mirror roller connected in sequence.

* * * * *